United States Patent
Guim Bernat et al.

(10) Patent No.: US 11,036,642 B2
(45) Date of Patent: Jun. 15, 2021

(54) ARCHITECTURAL ENHANCEMENTS FOR COMPUTING SYSTEMS HAVING ARTIFICIAL INTELLIGENCE LOGIC DISPOSED LOCALLY TO MEMORY

(71) Applicant: Intel Corporation, Santa Clara, CA (US)

(72) Inventors: Francesc Guim Bernat, Barcelona (ES); Dimitrios Ziakas, Hillsboro, OR (US); Mark A. Schmisseur, Phoenix, AZ (US); Kshitij A. Doshi, Tempe, AZ (US); Kimberly A. Malone, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/396,576

(22) Filed: Apr. 26, 2019

(65) Prior Publication Data
US 2019/0251034 A1    Aug. 15, 2019

(51) Int. Cl.
*G06F 9/50* (2006.01)
*G06F 12/0888* (2016.01)
*G06F 12/1027* (2016.01)
*G06N 3/04* (2006.01)
*G06F 12/06* (2006.01)

(52) U.S. Cl.
CPC ........ *G06F 12/0888* (2013.01); *G06F 9/5016* (2013.01); *G06F 9/5061* (2013.01); *G06F 12/0607* (2013.01); *G06F 12/1027* (2013.01); *G06N 3/04* (2013.01)

(58) Field of Classification Search
CPC ............. G06F 12/0888; G06F 12/1027; G06F 9/5016; G06F 9/5061; G06F 12/0607; G06F 9/5072; G06N 3/04; G06N 3/0454
See application file for complete search history.

(56) References Cited

U.S. PATENT DOCUMENTS

| | | | | |
|---|---|---|---|---|
| 5,341,486 A | * | 8/1994 | Castle | G06F 12/0607 711/157 |
| 5,619,471 A | * | 4/1997 | Nunziata | G06F 12/0607 365/230.03 |
| 7,228,393 B2 | * | 6/2007 | Aakjer | G06F 12/0607 711/127 |

(Continued)

FOREIGN PATENT DOCUMENTS

WO    2017129325 A1    8/2017

OTHER PUBLICATIONS

Extended European Search Report for Patent Application No. 20 164 272.5, dated Sep. 4, 2020, 13 pages.

(Continued)

*Primary Examiner* — Tasnima Matin
(74) *Attorney, Agent, or Firm* — Compass IP Law PC

(57) ABSTRACT

A semiconductor chip is described. The semiconductor chip includes memory address decoder logic circuitry comprising different memory address bit manipulation paths to respectively impose different memory interleaving schemes for memory accesses directed to artificial intelligence information in a memory and non artificial intelligence information in the memory. The artificial intelligence information is to be processed with artificial intelligence logic circuitry disposed locally to the memory.

17 Claims, 9 Drawing Sheets

(56) References Cited

U.S. PATENT DOCUMENTS

| | | | |
|---|---|---|---|
| 7,318,114 B1* | 1/2008 | Cypher | G06F 12/0607 |
| | | | 711/127 |
| 2004/0076044 A1* | 4/2004 | Nowshadi | G06F 12/0607 |
| | | | 365/200 |
| 2007/0011559 A1* | 1/2007 | Cioffi | H03M 13/2782 |
| | | | 714/755 |
| 2013/0290597 A1* | 10/2013 | Faber | G06F 12/0238 |
| | | | 711/102 |
| 2017/0162235 A1 | 6/2017 | De et al. | |
| 2017/0168934 A1* | 6/2017 | Singh | G06F 13/18 |
| 2018/0032859 A1* | 2/2018 | Park | G06N 3/04 |
| 2019/0042928 A1 | 2/2019 | Young et al. | |
| 2019/0361816 A1 | 11/2019 | Chen et al. | |

OTHER PUBLICATIONS

Moss, et al., "A Customizable Matrix Multiplication Framework for the Intel HARPv2 Xeon + FPGA Platform" Session 3—A Deep Learning Case Study, FPGA'2018, Feb. 25-27, pp. 107-116, Monterey, California, USA.

* cited by examiner

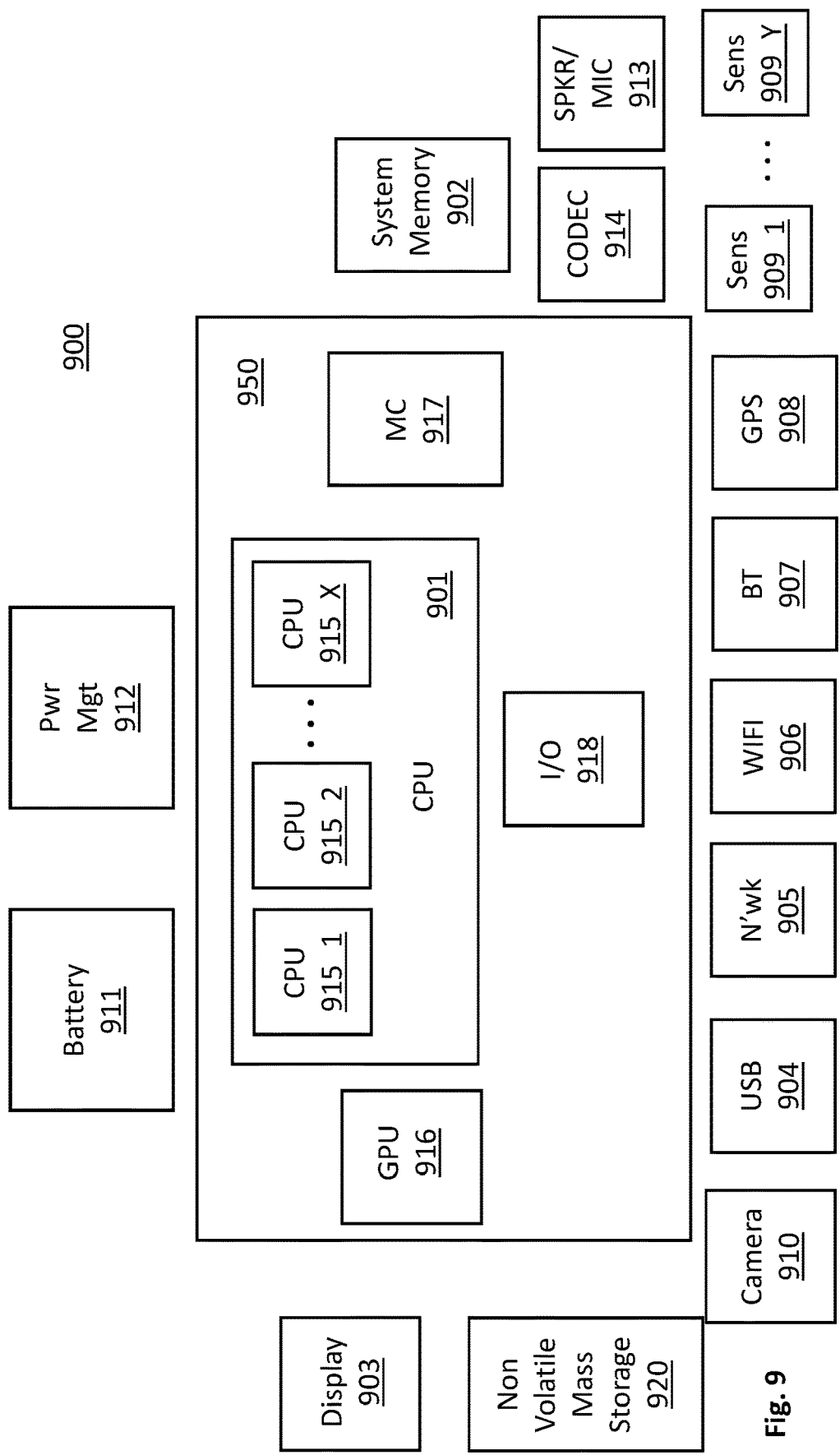

ARCHITECTURAL ENHANCEMENTS FOR COMPUTING SYSTEMS HAVING ARTIFICIAL INTELLIGENCE LOGIC DISPOSED LOCALLY TO MEMORY

FIELD OF INVENTION

The field of invention pertains generally to the computing sciences, and, more specifically, to architectural enhancements for computing systems having artificial intelligence logic disposed locally to memory.

BACKGROUND

With the emergence of artificial intelligence as an functional need for various business and/or government entities, computing system designers are exploring new ways to integrate artificial intelligence processing into the computing systems they design.

FIGURES

A better understanding of the present invention can be obtained from the following detailed description in conjunction with the following drawings, in which:

FIG. 9 shows a computing system.

DETAILED DESCRIPTION

Figure 1:
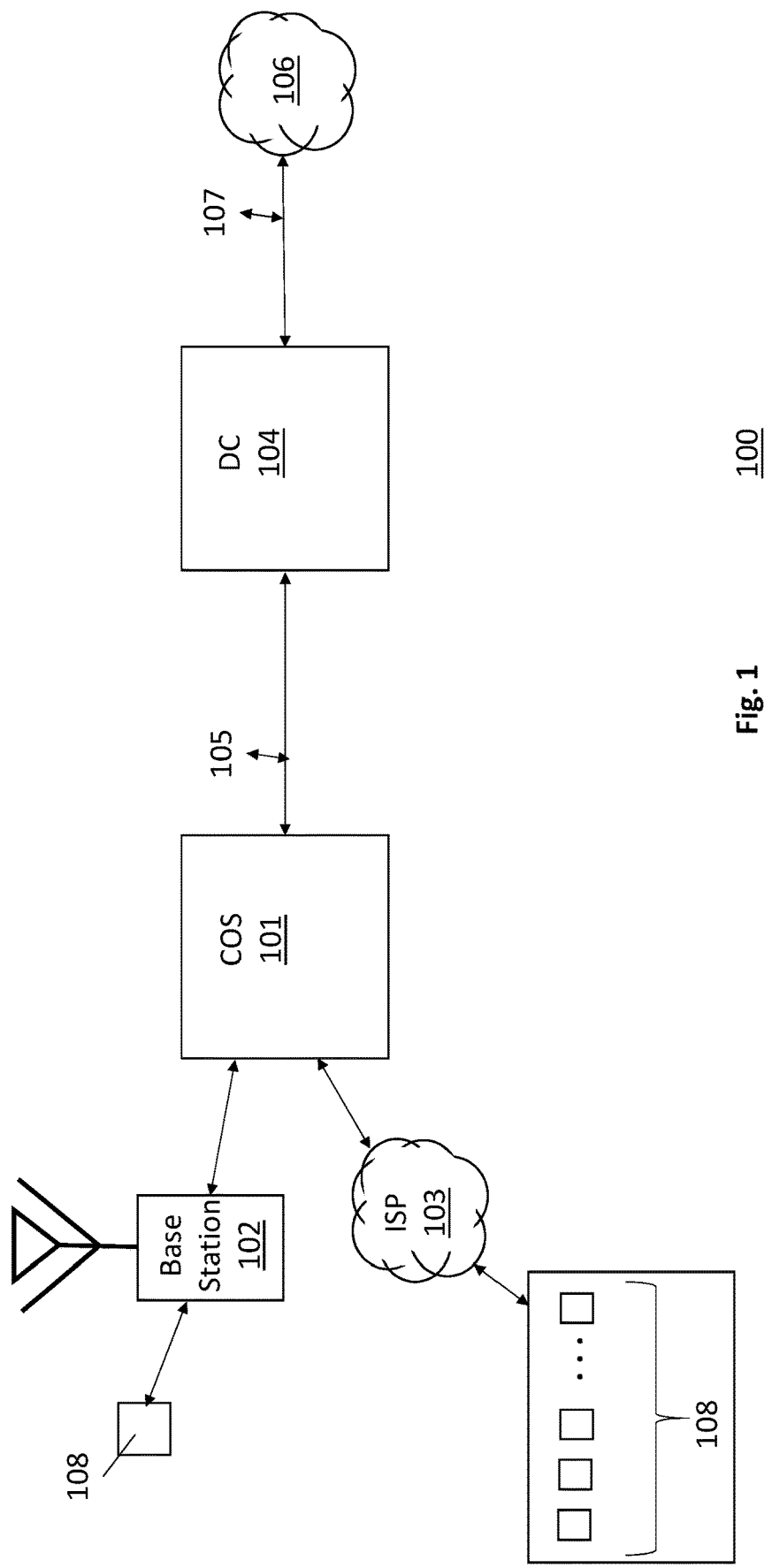
FIG. 1 shows a traditional IS infrastructure.

FIG. 1 shows an information systems (IS) deployment 100 that is common to large entities such as large corporations and/or large government entities. As observed in FIG. 1, a central office switch 101 acts as a gateway between more regional/local networking infrastructure (e.g., a base station 102, local internet service provider 103, etc.) and the entity's data center 104. Here, not uncommonly, one or more high speed trunk lines 105 carry data traffic between the central office switch 101 and the data center 104 over a long geographic distance that separates the central office switch 101 and the data center 104.

The data center 104, in turn, relies upon a cloud service 106 for one or more IS services (e.g., cloud computing, cloud storage, etc.). Here, various client devices 108 (e.g., mobile devices (e.g., smartphones, laptop computers) and/or desktop computers, tower computers, etc.) access data that is stored by the cloud service 106 and/or access/invoke applications that the cloud service 106 is executing.

An emerging trend is edge computing. Referring to FIG. 1, note the long distance (e.g., geographic (in terms of physical distance) and/or logical (in terms of nodal hops over the infrastructure 100)), that exists between a cloud application that is executing in the cloud service 106 and a client 108 that invokes the application. In use cases where large amounts of data traffic are transported over the trunk line 107 between the cloud service 106 and the data center 104, and/or the trunk line 105 between the data center 104 and the central office switch 101, significant time delays can be observed by a client device 108 that is invoking an application in the cloud 106.

In order to reduce such delays, IS managers are seeking to push functionality out of the cloud 106 towards a processing resource that is much closer to an invoking client 108. As such, IS managers are seeking ways, for example, to push application functionality into any/all of the local central office switch 101, the base station 102 that a mobile client is communicating with, and/or the hardware resources of the client devices' local ISP 103.

Figure 2:
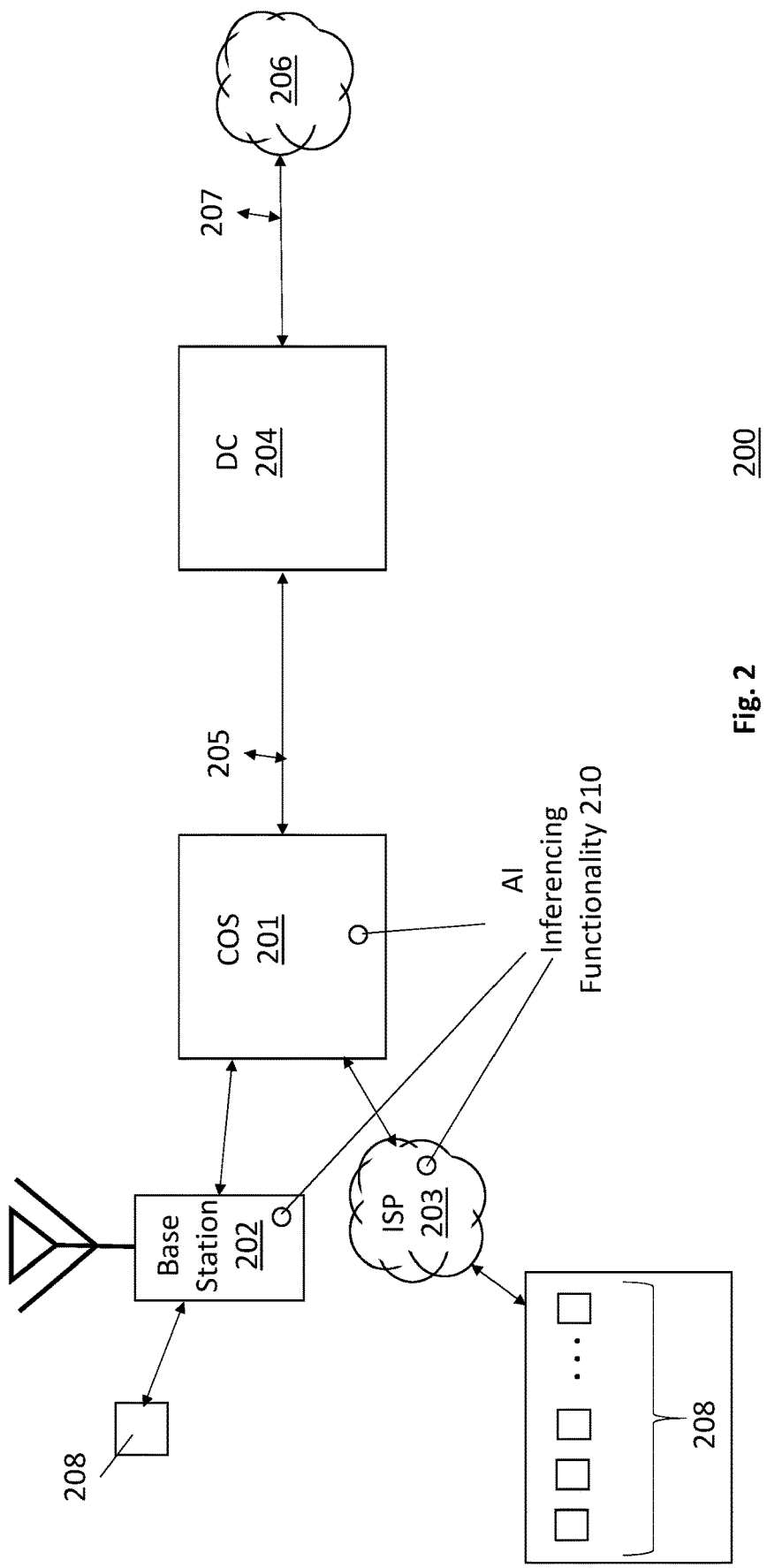
FIG. 2 shows an IS infrastructure with edge located AI processing functions.

FIG. 2 shows a possible edge computing architecture in which certain functions that traditionally have been implemented in the cloud 206 have instead been integrated into edge components 201, 202 and 203 so as to reduce the aforementioned delays. That is, with various functions being performed at an edge component, latency issues associated with large geographic distances and/or multiple nodal hops within an IS infrastructure should be greatly reduced resulting in completion of such functions, from a client's perspective, in significantly less time than if such function were performed in the cloud 206.

One function that can benefit from being migrated into the edge is artificial intelligence (AI) inferencing 210. AI inferencing refers to the decisions(s) made by an AI function in response to the data that the AI function is asked to process. Some possible AI inferencing functions include image recognition, speech recognition, natural language processing, visual search, and personalized recommendations among other possibilities.

As is known in the art, an AI function is typically realized as a neural network implemented on one or more semiconductor chips. Incoming data is presented to the neural network and the neural network processes the data to generate an output, referred to as an "inference", that indicates some intelligent decision made by the neural network in view of the data that it was presented with. For example, if a particular neural network implements a facial recognition function, a stream of images having faces (e.g., generated by a camera) may be fed to the neural network. The neural network then, ideally, provides inferences of a match for those facial images that match sought for criteria and provides inferences of no match for those facial images that do not match sought for criteria.

Thus, referring to FIG. 2, if an AI inferencing function 210 is implemented at any of locations 201, 202 and 203, the AI inferencing function should be completed much faster from the perspective of a client that sent the data that was processed by the AI function as compared to having the AI function performed in the cloud 206. That is, e.g., large amounts of streamed video, audio and/or user interaction data that is sent into the IS infrastructure from a client 208 (e.g., camera, smartphone, computer, etc.) is processed by a neural network at points 201, 202, 203 rather than being streamed end-to-end across the infrastructure to the cloud 206 for processing there (where AI functions have traditionally been located). Further still, because off-loading the cloud is a main point, migrating AI inferencing from the cloud 206 to the data center 204 is an improvement.

Figure 3:
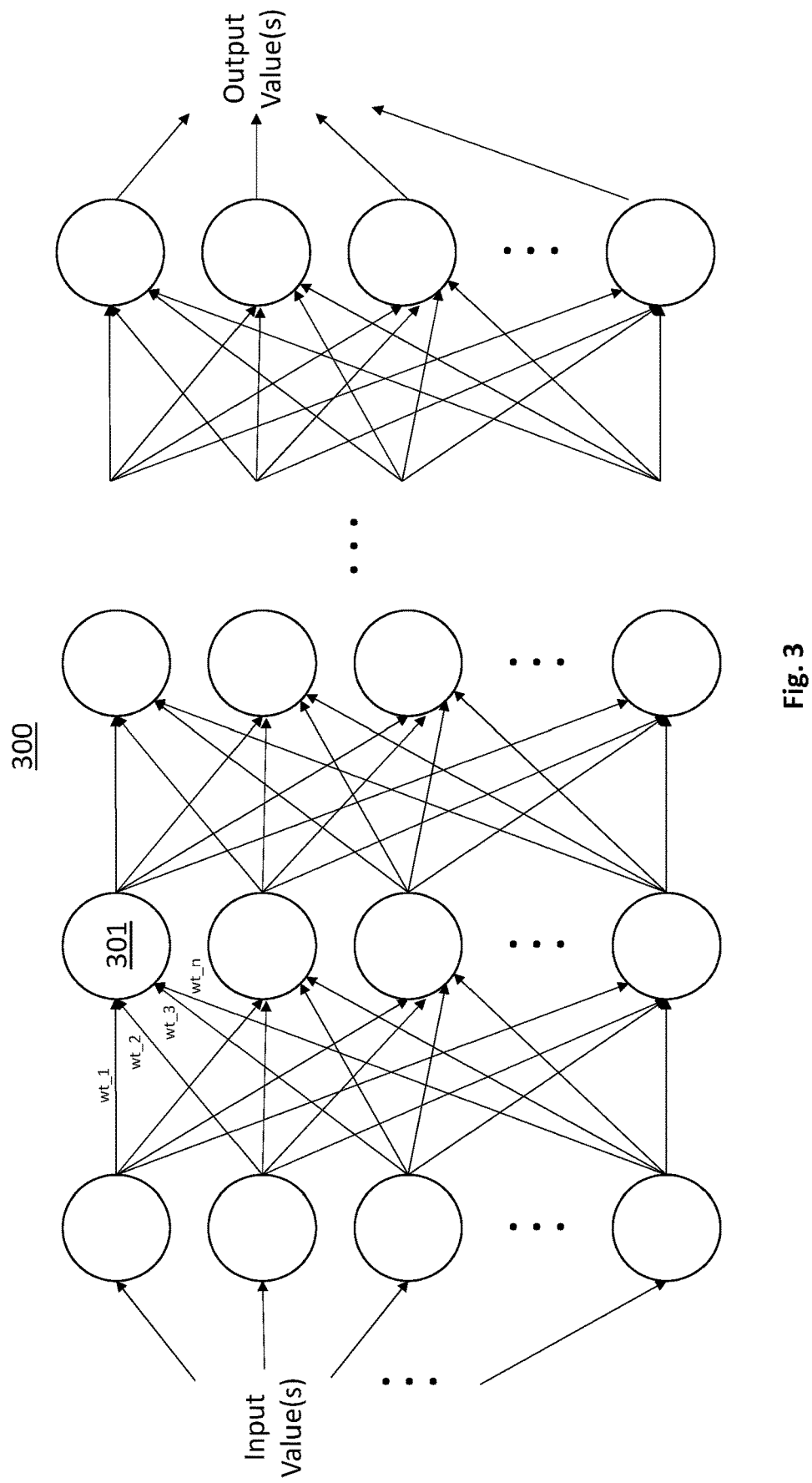
FIG. 3 shows a neural network.

FIG. 3 depicts an exemplary neural network 300. As observed in FIG. 3 the inner layers of a neural network can largely be viewed as layers of neurons that each receive weighted outputs from the neurons of other (e.g., preceding) layer(s) of neurons in a mesh-like interconnection structure between layers. The weight of the connection from the output of a particular preceding neuron to the input of another subsequent neuron is set according to the influence or effect that the preceding neuron is to have on the subsequent neuron (for ease of drawing only one neuron 301 and the weights of input connections are labeled). Here, the output value of the preceding neuron is multiplied by the weight of its connection to the subsequent neuron to determine the particular stimulus that the preceding neuron presents to the subsequent neuron.

A neuron's total input stimulus corresponds to the combined stimulation of all of its weighted input connections. According to various implementations, the combined stimulation is calculated as a multi-dimensional (e.g., vector) multiply accumulate operation. Here, output values from preceding neurons are multiplied by their respective weights to produce a set of products. The set of products are then accumulated (added) to generate the input stimulus to the receiving neuron. A (e.g., non-linear or linear) mathematical function is then performed using the stimulus as its input which represents the processing performed by the receiving neuron. That is, the output of the mathematical function corresponds to the output of the neuron which is subsequently multiplied by the respective weights of the neuron's output connections to its following neurons. The neurons of some extended neural-networks, referred to as "thresholding" neural networks, do not trigger execution of their mathematical function unless the neuron's total input stimulus exceeds some threshold. Although the particular exemplary neural network of FIG. 3 is a purely "feed forward" structure, other neural networks may exhibit some reverse flow or feedback in their data flows.

Notably, generally, the more connections between neurons, the more neurons per layer and/or the more layers of neurons, the greater the intelligence the network is capable of achieving. As such, neural networks for actual, real-world artificial intelligence applications are generally characterized by large numbers of neurons and large numbers of connections between neurons. Extremely large numbers of calculations (not only for neuron output functions but also weighted connections) are therefore necessary in order to process information through a neural network.

Recalling the discussion of FIG. 2 concerning the migration of AI inferencing functions 210 to the edge and/or at least to the data center 204, a problem with implementing AI functions at the edge and/or data center 204 is the amount of computational resources needed to implement them. Specifically, as described above, AI functions generally require large amounts of memory space. For example, referring to FIG. 3, any of each neuron output value, each weight that is multiplied with a neuron output value and/or each neuron input value can consume a memory location. The extremely large numbers of neurons and inter-neural connections that exist in the large scale neural networks used for commercial AI inferencing make execution of AI functions as standard application software programs on a CPU or GPU difficult to implement.

More specifically, the read/write activity between the CPU/GPU core(s) and system memory that is needed to perform all the calculations is extremely intensive. In short, the overhead and energy associated with repeatedly moving large amounts of read data from system memory, processing that data by the CPU/GPU cores and then writing resultants back to system memory, across the many millions or billions of computations needed to effect the neural network is far from optimal.

In order to dramatically improve upon this inefficiency, new hardware architectures are being proposed that dramatically reduce the overhead associated with implementing a neural network with a traditional CPU or GPU.

Figure 4:
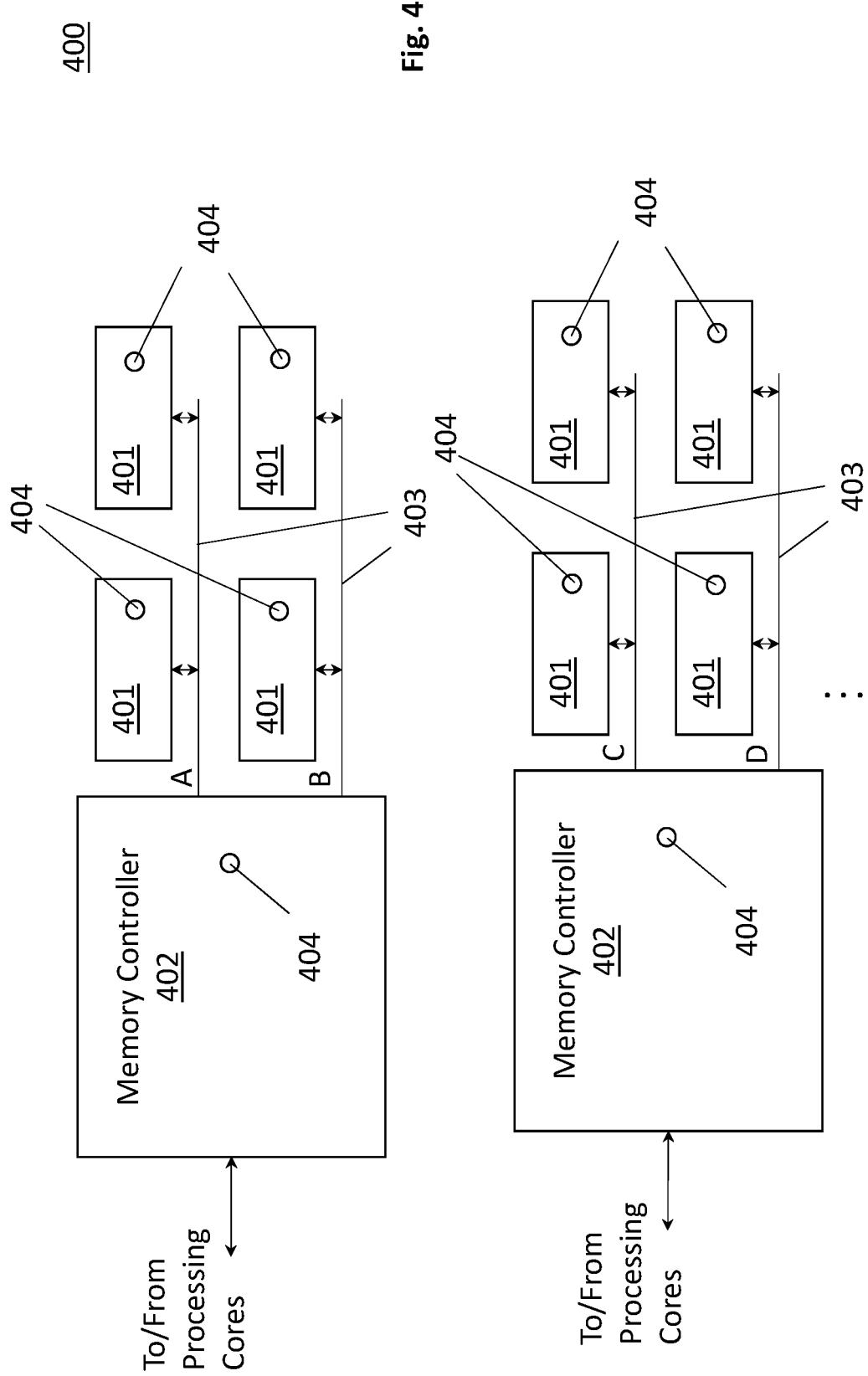
FIG. 4 shows a memory system with integrated AI processing logic.

FIG. 4 shows one such architecture 400 in which neural network processing logic 404 is instantiated within the memory system of a computer. Here, as can be seen in FIG. 4, system memory 400 is implemented as a number of memory modules 401 that are coupled to respective main memory controllers 402 by way of respective memory channels 403. Each memory module has memory chips to implement, e.g., the main memory of the system (e.g., traditional dual in-line memory module (DIMM), stacked memory chip memory module, etc.).

Generally, each memory controller 402 is allocated a range of system memory address space so that a CPU read/write request having a particular memory address causes the request to be directed to the memory controller whose allocated address range the request's memory address falls within. The memory controller 402 that receives the request then resolves the particular address to one of its particular memory channels, a particular memory module on the selected channel and/or one or more memory chip(s) on the selected module.

According to the memory system design of FIG. 4, neural network (or more generally, AI) processing logic 404 is instantiated within the memory controllers 402 and/or memory modules 401. Neural network processing logic 404 is special hardware and/or firmware for executing the computations of a neural network (e.g., for each of multiple neurons: multiplying the output values of preceding neurons with their corresponding weights, summing the multiplication results, executing the neuron's function using the summation result as an input operand, etc.). At a high level, the AI processing logic 404 reads values from memory, performs some operation on the read data and then writes the resultant back to memory.

For example, according to one scenario, the processing logic 404 reads output values of preceding neurons and their corresponding weights from memory, performs a multiply accumulate on the read values, performs a neuron's math function on the resultant of the multiply accumulate operation and then writes the resultant of the math function (which corresponds to the output of a neuron) back to memory. The above scenario may need to be executed millions or billions of times (e.g., once for each neuron in the neural network) in order to fully execute a complete neural network.

Placing the AI processing logic 404 closely to the memory where the read values are read from and/or written to results in much lower power consumption than processing the neural network as application software on a standard CPU/GPU because the read/write information does not have to travel as long a distance through the system. For similar reasons the neural network is processed with greater performance (less time is consumed accessing the data that is processed by the neural network).

A problem with integrating the AI processing elements 404 so closely to the memory resources, however, is that "interleaving" becomes difficult if not impossible to realize. Interleaving is a hardware address manipulation mechanism for parallelizing memory reads and/or writes. Interleaving can exist on a same channel (e.g., chip select or rank interleaving in which the hardware attempts to minimize page openings and closings on a same channel) and/or across channels of a same memory controller (sequential/consecutive addresses map to different channels of a same memory controller) and/or across memory controllers (certain sequential/consecutive addresses map to different memory controllers).

Although interleaving is advantageous in traditional computing systems where the processing elements that process the data (e.g., one or more CPUs) are remote from the memory hierarchy, by contrast, interleaving becomes much more difficult when the processing elements, such as the AI processing elements 404 of FIG. 4, are distributed within the memory system itself. For example, consider a scenario where a neural network processing element disposed on a memory module has to process data that has been interleaved (or "striped") across each of multiple memory channels and/or each of multiple memory controllers. In this case, large amounts of data will have to be read from each of the channels and/or memory controllers only to be re-presented on the channel of the processing element. The data steering control needed to effect such a transfer is very difficult to implement on the memory controller(s) and is practically impossible to effect from a memory module by itself. In fact, it makes more sense to compact as much information needed to perform a complete AI (e.g., neural network) function as closely together as possible (e.g., on a same DIMM).

As such, integrating AI inferencing on one or more edge components or within the data center, as discussed above with respect to FIG. 2, is not easy to achieve. Generally speaking, if the computing systems associated with the edge or data center components have AI inferencing logic integrated within their memory systems, as discussed above with respect to FIG. 4, such systems will not be able to use traditional interleaved memory addressing.

Without traditional interleaved memory addressing the performance of these computing systems for non AI functions can suffer. Additionally, because computing resources at the edge are generally more limited than in the cloud, computing resources such as system memory are generally shared in order to service many clients at the edge. For example, if an edge function is mimicking cloud storage, a currently active client's files may be swapped into memory from mass storage in place of a currently inactive client's files which must be swapped out of memory beforehand. With a slower memory, the swapping of information for different clients in/out to/from system memory may not be feasible (the swapping activity consumes too much time). These same perspectives apply to data center computers—particularly if their resources are constrained and need to be shared amongst multiple end point users.

Thus, integrating AI inferencing at the edge (or data center) with AI processing logic that is integrated within computing system memory can detrimentally impact the ability to provide other edge (or data center) functions and/or provide edge functions for large numbers of clients.

Figure 5:
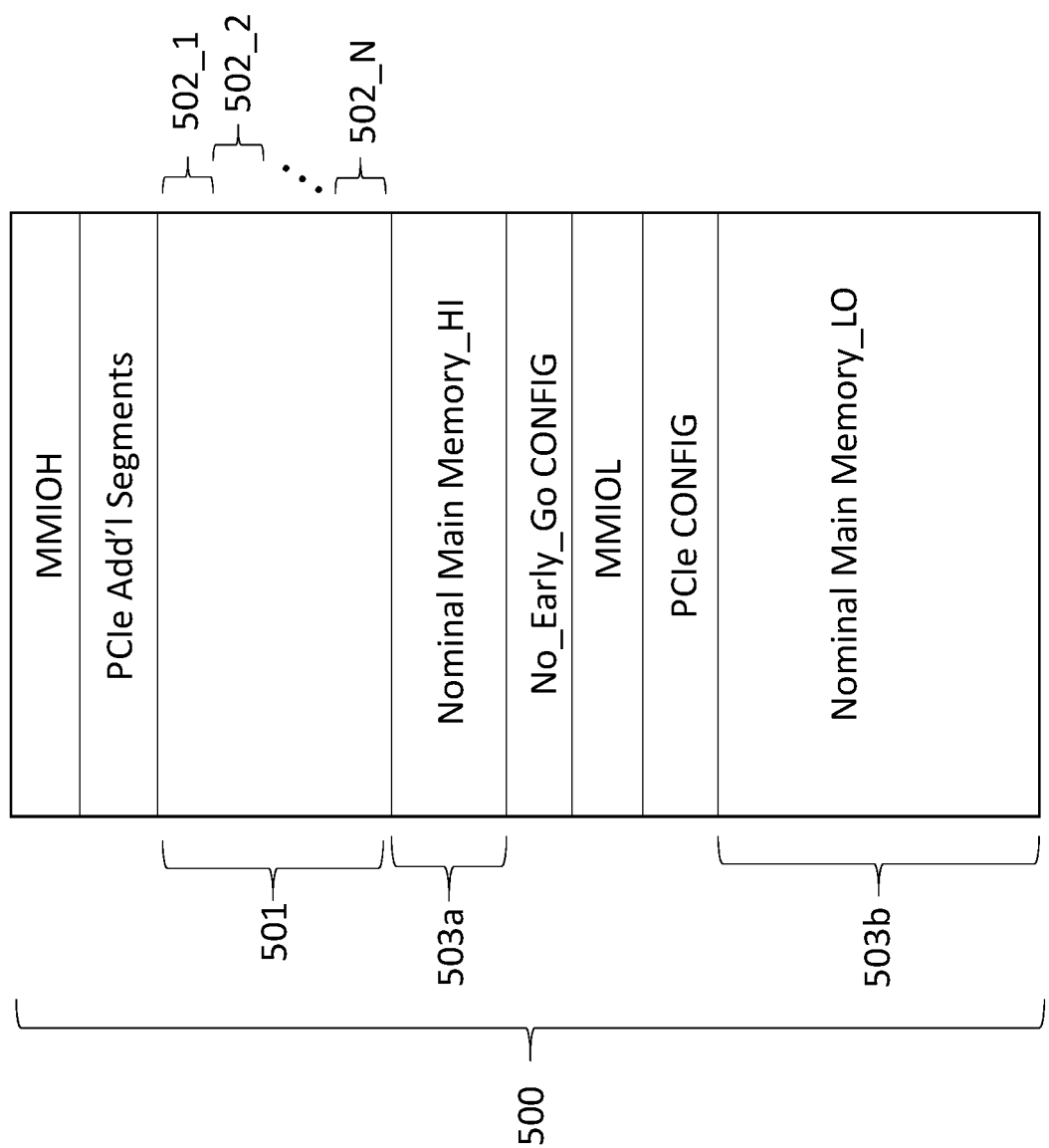
FIG. 5 shows memory space having a special partition for artificial intelligence information.

FIG. 5 shows one improvement that reserves a section 501 of the overall memory address space 500 for a number of memory address range sub-sections 502_1 through 502_N each of which have limited and/or configurable interleaving granularity. Here, for instance, each memory address range sub-section 502 can be assigned to a different neural network (different "AI model"). For example, a first memory address sub-range 502_1 is assigned to a first neural network or AI model that is used for facial recognition inferencing, while, a second memory address sub-range 502_2 is assigned to a second neural network or AI model that is used for audio stream inferencing.

Importantly, each memory address sub-range 502_1 through 502_N may have its own configured memory interleaving granularity. Here as different AI models are apt to have different sizes/dimensions (e.g., in terms of the number of neuron levels and/or the number of inter-neuron connections), and/or the underlying hardware may be able to support different degrees of (limited) interleaving for AI functions, not only can limited (or no) interleaving be made available for AI functions, but also, full or otherwise traditional interleaving may remain in place for non AI functions which operate out of traditional main memory space 503.

For example, consider a first hardware platform that cannot support any interleaving for the neural network processing instances that are distributed in the memory system, each of the sub-ranges 502_1 through 502_N are configured to not have any interleaving at all (whether inter-channel, intra-channel or inter-memory controller). Notably, however, the traditional memory address space 503 that is not reserved for AI model content is free to have any of the traditional memory interleaving schemes applied to it.

In this case, if memory channels ("A and B") include memory modules having embedded AI processing logic while the remaining memory channels ("C+") do not have any memory modules with embedded AI processing logic, then, the information of the AI models supported by the system are stored on memory channels A and B with the further preference that the information for a same AI model be stored on a same memory channel, or even a same memory module. Each sub-range 502_1 through 502_N therefore defines the memory space allocation for its respective AI model to be confined to only one of memory channels A or B and further defines that no memory interleaving of any kind is to be performed (not even intra-channel). By contrast, standard/nominal memory space 503 that is directed to memory channels C+ can be configured to implement any of the standard/traditional memory interleaving techniques (intra-channel, inter-channel, and/or inter-memory controller).

As another example, consider a second hardware platform that supports some limited interleaving for neural network processing instances that are distributed in the memory system. For example, data on a same channel may have intra-channel interleaving and/or data may be interleaved across no more than two memory channels. Again, assume that memory channels A, B include memory modules having embedded AI processing logic while the remaining memory channels C+ do not have any memory modules with embedded AI processing logic.

In this case, each of the different sub-sections 502_1 through 502_N define the respective memory ranges for their respective AI models to either be confined to a same channel with intra-channel interleaving, or, confined to memory channels A and B with intra-channel and/or inter-channel interleaving. Again, standard/nominal memory space 503 that is directed to memory channels C+ can be configured to implement any of the standard/traditional memory interleaving techniques (intra-channel, inter-channel, and/or inter-memory controller).

Figure 6:
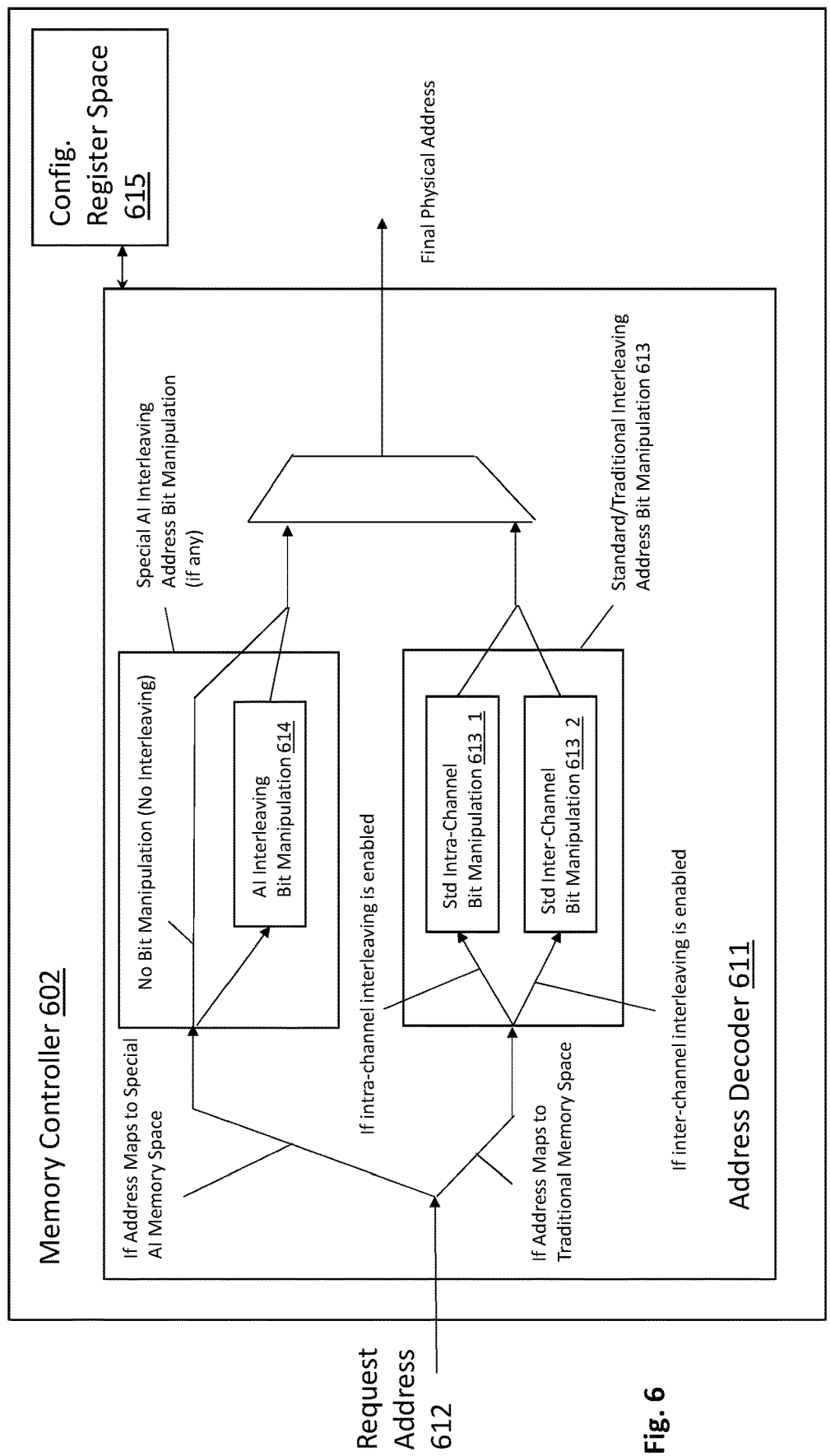
FIG. 6 shows a memory controller having different address decoding processing paths for memory requests directed to artificial intelligence information and non artificial intelligence information.

FIG. 6 shows a memory controller 602 having an address decoder 611 that supports the above addressing scheme. As observed in FIG. 6, the memory controller receives a request, e.g., from a CPU core, that includes a physical address 612. If the physical address 612 maps to the standard/traditional address space 503, the address decoder 611 applies whatever traditional interleaving has been configured for the traditional address space. Specifically, one or more of intra-channel and inter-channel address bit manipulation blocks 613_1, 613_2 are enabled to manipulate the physical address so that the access is directed to the proper memory location in accordance with the configured-for interleaving scheme. Here, configuration register space 615 is programmed, e.g., by BIOS or UEFI firmware during system boot-up, to establish the inter-leaving configuration for the traditional memory space 503.

By contrast, if the request contains a memory address 612 that maps to the memory space allocated to one of the AI models, and/or contains an identifier of a particular AI model (e.g., an AI model ID), the address decoder 611 looks to the memory space allocation definition and the inter-leaving configuration information for the particular memory sub range (e.g., sub-range 502_1) that contains the targeted AI model's information.

The address decoder 611 then manipulates the address with whatever (e.g., limited) inter-leaving scheme 614 is enabled for that sub-section, if any. Here, bit manipulation block(s) 614 may contain, e.g., identical or limited intra-channel inter-leaving bit manipulation as compared to the traditional intra-channel bit manipulation block, and/or limited inter-channel bit manipulation as compared to the traditional inter-channel bit manipulation. In the case where no interleaving is to occur at all, all the bit manipulation block(s) 614 are bypassed. Here, configuration register space 615 is programmed, e.g., by BIOS or UEFI firmware during system boot-up, to establish the memory space allocation and inter-leaving configuration for each of the memory space sub-sections/AI models.

In some embodiments, e.g., where all information for a same AI model is to be kept on a same bank, rank or module, various kinds of inter-leaving do not exist for the AI model memory sub-sections and one or more of the bit manipulation blocks do not exist within the system address decoder along the address processing path for addresses that map to the special AI memory space 502.

Figure 7:
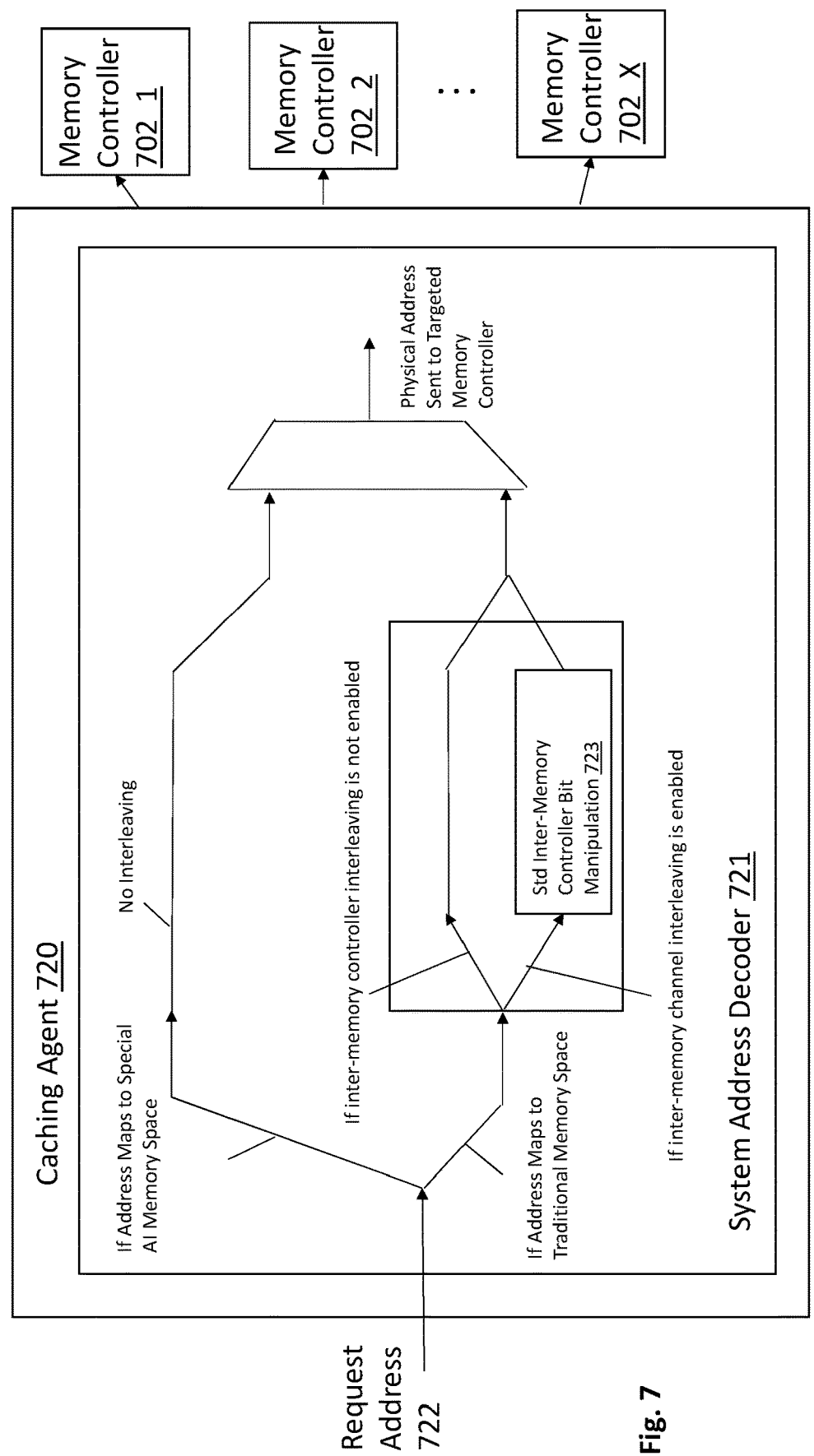
FIG. 7 shows a caching agent having different address decoding processing paths for memory requests directed to artificial intelligence information and non artificial intelligence information.

FIG. 7 shows an extended system address decoding function for use in systems that entertain inter-memory controller interleaving (consecutive addresses are spread across multiple memory controllers). Large scale multi-processor computing systems typically have multiple memory controllers where each memory controller is allocated its own "slice" of overall system memory address space.

Caching agents are a layer of functionality that reside somewhere between the memory controllers and the processors to detect/resolve conflicting requests and then distribute requests to the correct memory controller based on request address. Caching agents are therefore a suitable architectural location to implement inter-memory controller interleaving.

FIG. 7 depicts a caching agent 720 with integrated address decoder 721 having traditional address bit manipulation logic 723 to effect inter-memory controller interleaving, if enabled, for system memory requests having addresses that map to traditional/standard memory space 503. By contrast, at least for systems that do not support any kind of inter-memory controller interleaving for AI models, the address bit manipulation logic 723 is bypassed if the received request includes an address 722 that maps to an AI model's allocated memory space sub-section (or identifies an AI model). As such, standard memory request streams can be interleaved across memory controllers but request streams for AI models will not be.

Figure 8:
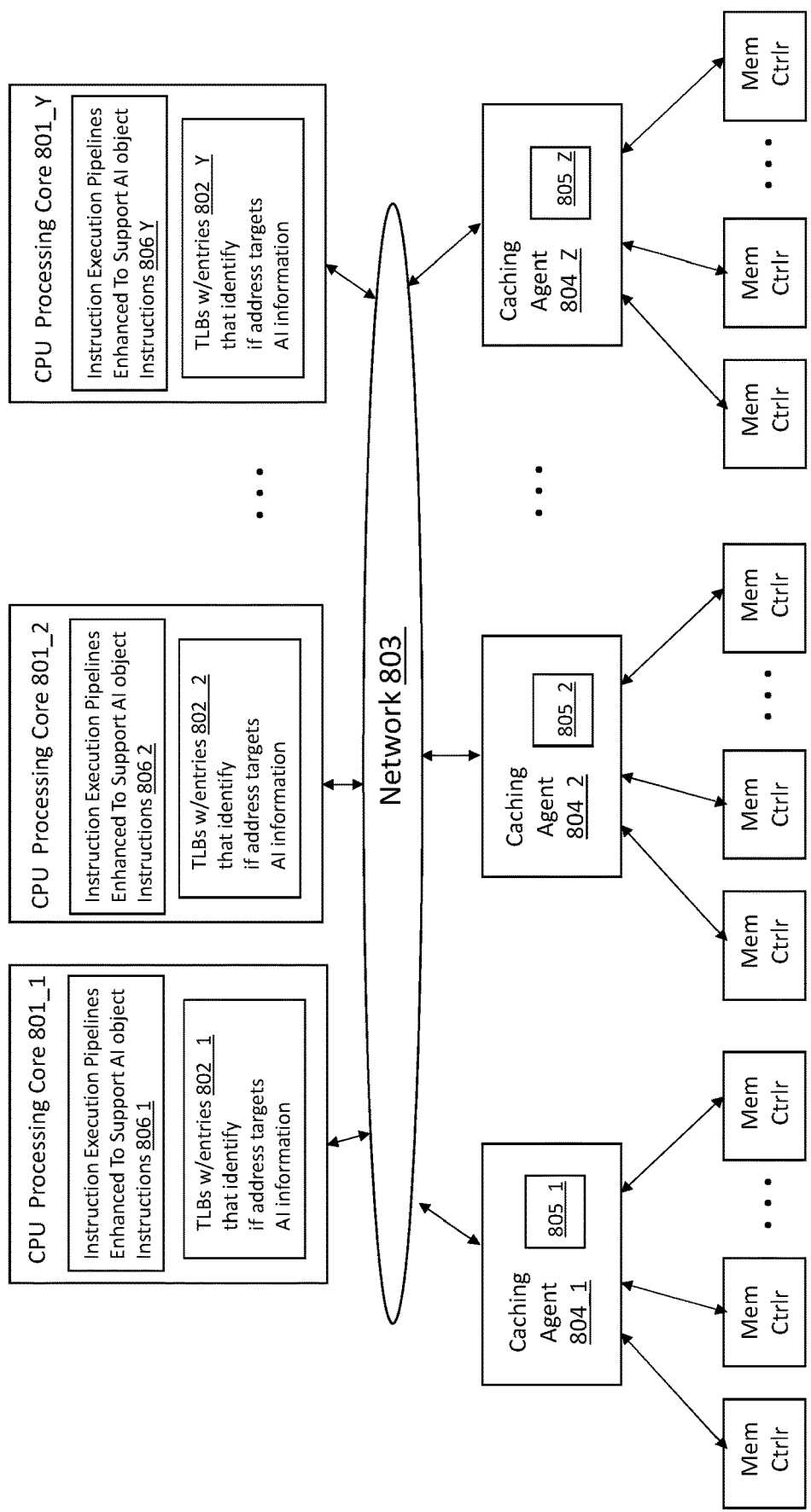
FIG. 8 shows a computing system having processing cores with an enhanced artificial intelligence aware TLB and instruction architecture that supports a memory access instruction that commands AI processing logic that is disposed locally to the memory.

FIG. 8 pertains to another approach in which the data set that an AI model operates upon is identified by an object ID. As is known in the art, AI models are first trained on "training" data sets. The training process, also referred to as machine learning, includes, e.g., adjusting weight values of inter-neuron connections in a neural network until the inferencing of the neural network in response to the training data sets is correct. Once an AI model has been suitably trained it is deployed, e.g., in a computing system such as a computing system described above with respect to FIG. 4 having AI processing logic integrated within its memory system. Real "live" data sets are then applied to the AI models for actual inferencing.

Here, the "live" data sets may be granularized into "objects". For example, a facial recognition AI model may operate on a stream of images to recognize the existence of faces within the image stream and extract them (a second, following AI model may then process the extracted face images to identify a person of interest).

Here, each image in the image stream (e.g., each frame or snapshot) may be referred to as an object. The AI model then processes the objects on an object-by-object basis. In this case, for example, an edge (or data center) computing system receives a steady stream of objects (e.g., from a camera) and writes each object into memory. The AI model, operating from within the memory system (e.g., on a memory module), then calls up a first of these objects and makes an inference on that object (whether sought for face(s) exist or not). Upon writing its inference result for the first object, the AI model then moves and processes the next object. The sequence continues as long as new objects are being written into memory.

The improved system of FIGS. 8 and 9 includes architectural hooks that allow objects to be accessed in memory, both for their initial write into memory and for their subsequent read and processing by an AI model.

FIG. 8 shows a computing system having multiple processing cores 801 interconnected to multiple caching agents 804 through a network 803. Each caching agent is coupled to multiple memory controllers. The memory controllers and/or the memory controllers coupled to them include AI processing logic as discussed above with respect to FIG. 4. Each caching agent 804 is responsible for distributing memory access requests to the correct memory controller (e.g., based on the request's memory address). The network 803 is responsible for delivering a memory access request issued by a particular processing core to the correct caching agent (e.g., based on the request's memory address).

For simplicity it is assumed that inter-memory controller interleaving is not possible for AI objects (i.e., an object must be fully stored within the memory resources that are coupled to a single memory controller). Here, the translation look-aside buffer (TLB) 802 of each instruction execution pipeline of each processing core 801 includes an extra item of information in each TLB entry.

As is known in the art, application software is written with logical memory addresses that must be mapped to physical memory addresses. A TLB performs this translation. In particular, a TLB uses the logical address of a memory access instruction as a look-up parameter across the multiple entries in the TLB of the execution pipeline that executes the memory access instruction. The TLB entry with the matching logical address includes the physical address for that logical address. A memory access request (e.g., a packet)

that includes the physical address is then constructed and sent over the network where it is processed by the receiving caching agent.

In the improved system of FIG. 8, memory space that is reserved for the keeping of AI objects is registered with the TLBs 802. Additionally, each TLB entry is enhanced to include information that indicates whether or not the entry corresponds to an AI object. As such, after registration of an AI object with the TLBs 802, any TLB entry having a physical address that maps to this memory space is marked to indicate that the physical address corresponds to an AI object. Thereafter, upon the execution of a memory access instruction that attempt to reach the AI object in memory, the returned TLB information that indicates the access is directed to an AI object is embedded in the packet that is sent over the network 803 to the appropriate caching agent.

The receiving caching agent 804 includes logic circuitry 805 that, upon recognizing this information, causes the cache agent's inter-memory controller interleaving address bit manipulation processing to be by-passed and sends the memory access request to the particular memory controller whose memory resources keep the AI object. All memory requests directed to the AI object are processed in the same manner (as such, all memory requests directed to the AI object are directed to the same memory controller). Thus, in the case where a stream of objects are being received by the computing system and written into memory as the data sets for a particular AI model, the write requests issued from a processor core to cause these writes to happen are all processed in this manner.

Here, the instruction set architecture of the processing cores 801 can be extended 806 to include a new memory access instruction to support writing of data sets into memory for AI models. Here, the instruction is technically a memory access instruction because it is directed to memory. However, the instruction is actually an embedded command for the AI processing logic that is disposed locally to the memory. With the understanding that newly written data is to be operated upon by an AI model, the new instruction also identifies which AI model is to operate on the newly written data.

Thus, according to an embodiment of a first write instruction, the write instruction format identifies: 1) the write address of the object; 2) the payload (the data to be written, which may reference a location in mass storage, a network interface and/or network interface inbound queue (in which case the write instruction triggers a DMA transfer of the payload from mass storage or the network interface into memory)); 3) the AI model that is to execute the data in the payload; and, 4) a memory or register address where the result from the processing of the payload of 2) above by the AI model of 3) above is to be stored.

Here, since the AI processing logic instances that are distributed within the memory system are akin to a co-processor, the information of the above instruction takes the form of a co-processor command that identifies: a) the function to performed (specified in 3) above); b) where the input data is to be retrieved from (specified in 2) above); c) where the input data is to be stored in memory (specified in 1) above—the AI processing logic is presumed to be able to read the data from memory when it is ready to operate on it, which is easiest in the case of "on-module" AI processing logic when the data of c) is stored on the same memory module as the AI processing logic that is to process it); and, d) where the resultant (the inference) of the AI model's execution on the input data is to be written (which may be in memory or register space).

Thus, when a memory request formatted from such an instruction finally reaches the AI processing logic in memory, the AI processing logic has all the information it needs to execute upon the newly stored data set/object.

In still further embodiments, a TLB entry that indicates that a particular entry corresponds to an AI object may include an ID for the AI object ("AI object ID") that the entry refers to. The AI object ID may be included in the packet sent to the caching agent for, e.g., easier reference as to which memory controller the request is to be sent to.

Here, an object (and correspondingly its object ID) can correspond to a specific data set (a particular frame or snapshot), or, more generally, can correspond to the memory space where more than one data set of like data is to be stored (more than one frame or snapshot from a same video stream). In the case of the later, for example, recalling the aforementioned example of an image stream, rather than assign an object ID to each frame or snapshot in the image stream, instead, the "AI object" and corresponding AI object ID simply refers to the data stream itself and/or its memory space. Thus, multiple frames/snapshots from a same data stream can be associated with the same object and object ID.

In such embodiments, the instruction set architecture can be expanded to include an extension of the instruction discussed just above. That is, in an embodiment, the instruction set architecture is expanded 806 to include an instruction that identifies: 1) the base address for the object; 2) an offset from the base (which, e.g., identifies the starting point in memory of a particular frame or snapshot); 3) the payload (same as 2) in the above instruction); 4) the AI model that is to execute upon, e.g., a fixed amount of payload data starting from the offset; and, 5) a memory or register address where the inference from the AI model that processes the payload data identified in 1) and 2) above is to be stored.

In various embodiments, interleaving within a particular memory controller (e.g., intra-channel interleaving and/or inter-channel interleaving) may be performed by the target memory controller for a particular object, e.g., according to a memory sub-section allocation that is configured for the object similar to the per AI model allocations 502 described above with respect to FIG. 5.

Note that in various embodiments more than one AI model may be identified in the instruction format so that multiple, different AI models may make inferences from a same data set. For example, if a first AI model is trained to identify a first specific face and a second AI model is trained to identify a second specific face, the data from the image stream of a camera may be written once into memory and then processed over by the different AI models identified in the single write instruction.

FIG. 9 provides an exemplary depiction of a computing system 900 (e.g., a smartphone, a tablet computer, a laptop computer, a desktop computer, a server computer, etc.). As observed in FIG. 9, the basic computing system 900 may include a central processing unit 901 (which may include, e.g., a plurality of general purpose processing cores 915_1 through 915_X) and a main memory controller 917 disposed on a multi-core processor or applications processor, system memory 902, a display 903 (e.g., touchscreen, flat-panel), a local wired point-to-point link (e.g., USB) interface 904, various network I/O functions 905 (such as an Ethernet interface and/or cellular modem subsystem), a wireless local area network (e.g., WiFi) interface 906, a wireless point-to-point link (e.g., Bluetooth) interface 907 and a Global Positioning System interface 908, various sensors 909_1 through 909_Y, one or more cameras 910, a battery 911, a power management control unit 912, a speaker and microphone 913 and an audio coder/decoder 914.

An applications processor or multi-core processor 950 may include one or more general purpose processing cores 915 within its CPU 901, one or more graphical processing units 916, a memory management function 917 (e.g., a memory controller) and an I/O control function 918. The general purpose processing cores 915 typically execute the operating system and application software of the computing system. The graphics processing unit 916 typically executes graphics intensive functions to, e.g., generate graphics information that is presented on the display 903. The memory control function 917 interfaces with the system memory 902 to write/read data to/from system memory 902. The power management control unit 912 generally controls the power consumption of the system 900.

Each of the touchscreen display 903, the communication interfaces 904-907, the GPS interface 908, the sensors 909, the camera(s) 910, and the speaker/microphone codec 913, 914 all can be viewed as various forms of I/O (input and/or output) relative to the overall computing system including, where appropriate, an integrated peripheral device as well (e.g., the one or more cameras 910). Depending on implementation, various ones of these I/O components may be integrated on the applications processor/multi-core processor 950 or may be located off the die or outside the package of the applications processor/multi-core processor 950. The computing system also includes non-volatile storage 920 which may be the mass storage component of the system.

The computing system of FIG. 9 may include or be associated with any of the features described above with respect to FIGS. 1 through 8. For example the computing system can include: 1) AI processing logic distributed within its memory system; 2) specially reserved memory space having customized/different interleaving settings than traditional memory to more easily implement/use the AI processing logic; 3) address decoders in the memory controllers and/or caching agents to provide memory accesses directed to AI information with different interleaving treatment than memory access directed to non AI information; 4) processing cores having TLBs that indicate whether a memory address corresponds to AI information and/or ISA enhancements to embed AI information write and/or AI processing logic commands in memory access requests that are sent from the processing cores to the memory controllers.

The aforementioned AI processing logic, memory controllers, caching agents and/or processing cores may be implemented with logic circuitry disposed on one or more semiconductor chips. The logic circuitry may be implemented with dedicated, hardwired logic circuits, programmable logic circuitry (e.g., field programmable gate array (FPGA) circuitry) and/or logic circuitry designed to execute program code (e.g., processor, processing core).

The memory may be composed of volatile memory (e.g., dynamic random access memory (DRAM)), non volatile memory (e.g., battery backed up DRAM, an emerging non byte addressable volatile memory technology (e.g., a resistive memory such as a phase change memory, ferro-electric memory, magnetic memory, spin transfer torque memory, etc.) or a combination of volatile and non-volatile memories.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components. For example a machine readable storage medium may be used to store drawings of components described herein, and/or, of automated socket assembly/manufacturing processes described herein.

Therefore elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A semiconductor chip, comprising:
memory address decoder logic circuitry comprising different memory address bit manipulation paths to respectively impose different memory interleaving schemes for memory accesses directed to artificial intelligence information in a memory and non artificial intelligence information in the memory, wherein, the artificial intelligence information is to be processed with artificial intelligence logic circuitry disposed locally to the memory, wherein the artificial intelligence information is information that is processed with a neural network and the non artificial intelligence information is information that is not processed with a neural network, wherein, the artificial intelligence logic circuitry is to implement a neural network that is to: 1) process the artificial intelligence information; and, 2) not process the non artificial intelligence information, and, wherein address space of the memory is partitioned into artificial intelligence address space and standard address space, the artificial intelligence address space further partitioned into separately configurable sections, each separately configurable section to be allocated to information for a particular AI model.

2. The semiconductor chip of claim 1 wherein the memory address decoder logic circuitry is within a caching agent.

3. The semiconductor chip of claim 1 wherein the memory address decoder logic circuitry is within a memory controller.

4. The semiconductor chip of claim 3 wherein the memory controller comprises artificial intelligence processing logic.

5. The semiconductor chip of claim 1 wherein an AI model's memory interleaving scheme is defined in the AI model's allocated configurable memory section.

6. The semiconductor chip of claim 5 wherein no interleaving is a configuration option of the AI model's allocated configurable memory section.

7. The semiconductor chip of claim 1 wherein the artificial intelligence information is to be accessed without interleaving.

8. The semiconductor chip of claim 1 wherein the memory comprises memory modules comprises artificial intelligence processing logic circuitry.

9. A computing system, comprising:
a network interface;
a plurality of processing cores;
a memory system having integrated AI processing logic; and,
memory address decoder logic circuitry comprising different memory address bit manipulation paths to respectively impose different memory interleaving schemes for memory accesses directed to artificial intelligence information in a memory and non artificial intelligence information in the memory, wherein, the artificial intelligence information is information that is processed with a neural network and the non artificial intelligence information is information that is not processed with a neural network, wherein, the artificial intelligence information is to be processed with artificial intelligence logic circuitry disposed locally to the memory, wherein, the artificial intelligence logic circuitry is to implement a neural network that is to: 1) process the artificial intelligence information; and, 2) not process the non artificial intelligence information, and wherein, address space of the memory is partitioned into artificial intelligence address space and standard address space, the artificial intelligence address space further partitioned into separately configurable sections, each separately configurable section to be allocated to information for a particular neural network amongst a plurality of neural networks.

10. The computing system of claim 9 wherein the memory address decoder logic circuitry is within a caching agent.

11. The computing system of claim 9 wherein the memory address decoder logic circuitry is within a memory controller.

12. The computing system of claim 9 wherein a memory interleaving scheme of a first neural network of the plurality of neural networks is defined in the first neural network's allocated configurable memory section.

13. The computing system of claim 12 wherein no interleaving is a configuration option of the first neural network's allocated configurable memory section.

14. The computing system of claim 9 wherein the artificial intelligence information is to be accessed without interleaving.

15. The computing system of claim 9 wherein at least one of the processing cores further comprise at least one of:
a) a translation lookaside buffer having an entry format that includes information that identifies if the entry's corresponding memory space contains information to be processed by the neural network;
b) an instruction execution pipeline to execute and instruction, the instruction having an instruction format, the instruction format having content that identifies: i) information in memory to be processed by the neural network; ii) the neural network; iii) where a result generated by the neural network is to be stored.

16. The computing system of claim 15 further comprising a caching agent, the caching agent to bypass interleaving memory address bit manipulation logic if a memory request includes information from the translation lookaside buffer that memory space targeted by the memory request contains artificial intelligence information to be processed by the neural network.

17. The computing system of claim 15 wherein the instruction format identifies the information in memory to be processed by the neural network with an object ID.

* * * * *